(12) United States Patent
Parker et al.

(10) Patent No.: US 11,448,235 B2
(45) Date of Patent: *Sep. 20, 2022

(54) AXI-CENTRIFUGAL COMPRESSOR WITH VARIABLE OUTLET GUIDE VANES

(71) Applicant: General Electric Company, Schenectady, NY (US)

(72) Inventors: David Vickery Parker, Lynn, MA (US); Wilhelm Ramon Hernandez, Lynn, MA (US); Basuki Srivastava, Lynn, MA (US); Paul Trimby, Lynn, MA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,499

(22) Filed: Jul. 6, 2020

(65) Prior Publication Data

US 2021/0102552 A1 Apr. 8, 2021

Related U.S. Application Data

(63) Continuation of application No. 15/510,841, filed as application No. PCT/US2015/044709 on Aug. 11, 2015, now Pat. No. 10,704,563.

(Continued)

(51) Int. Cl.
*F04D 29/46* (2006.01)
*F04D 17/02* (2006.01)
(Continued)

(52) U.S. Cl.
CPC ......... *F04D 29/462* (2013.01); *F01D 17/162* (2013.01); *F02C 3/04* (2013.01);
(Continued)

(58) Field of Classification Search
CPC ...... F04D 29/462; F04D 17/025; F04D 19/02; F04D 29/403; F04D 29/4213; F04D 29/563; F01D 17/162; F02C 3/04
See application file for complete search history.

(56) References Cited

U.S. PATENT DOCUMENTS

| | | | |
|---|---|---|---|
| 3,094,270 A * | 6/1963 | Kent ................... | F04D 27/023 251/24 |
| 2008/0031729 A1* | 2/2008 | Bouru .................. | F04D 29/563 415/160 |
| 2011/0158792 A1* | 6/2011 | Andrus ................ | F01D 17/162 415/159 |

(Continued)

FOREIGN PATENT DOCUMENTS

| | | |
|---|---|---|
| CA | 2687800 A1 | 6/2010 |
| CN | 1824957 A | 8/2006 |

(Continued)

OTHER PUBLICATIONS

Machine Translation and Second Office Action and Search issued in connection with corresponding CN Application No. 201580048820.0 dated May 17, 2018 (15 pages).

(Continued)

*Primary Examiner* — Syed O Hasan
(74) *Attorney, Agent, or Firm* — Hanley, Flight & Zimmerman, LLC

(57) ABSTRACT

An example compressor includes a casing having a main portion and an outer skirt collectively defining an annular plenum, an outlet guide vane coupled to the main portion, an actuator mounted outside the outer skirt, and a linkage coupled to the actuator and the outlet guide vane through the annular plenum.

20 Claims, 5 Drawing Sheets

Related U.S. Application Data

(60) Provisional application No. 62/049,586, filed on Sep. 12, 2014.

(51) Int. Cl.

| | | |
|---|---|---|
| *F04D 29/56* | (2006.01) | |
| *F01D 17/16* | (2006.01) | |
| *F04D 19/02* | (2006.01) | |
| *F04D 29/42* | (2006.01) | |
| *F02C 3/04* | (2006.01) | |
| *F04D 29/40* | (2006.01) | |

(52) U.S. Cl.
CPC .......... *F04D 17/025* (2013.01); *F04D 19/02* (2013.01); *F04D 29/403* (2013.01); *F04D 29/4213* (2013.01); *F04D 29/563* (2013.01); *F05D 2220/32* (2013.01); *F05D 2240/35* (2013.01)

(56) References Cited

U.S. PATENT DOCUMENTS

2012/0163960 A1* 6/2012 Ress, Jr. ............... F01D 17/162
                                                              415/173.1

FOREIGN PATENT DOCUMENTS

| CN | 102418712 A | 4/2012 |
|---|---|---|
| FR | 2433106 A1 | 3/1980 |
| GB | 704856 A | 3/1954 |
| GB | 2027811 A | 2/1980 |

OTHER PUBLICATIONS

Canada Office Action, "Office Action," issued in connection with Canadian Patent Application No. 2,959,993, dated Feb. 2, 2018 (4 pages).

Machine Translation and Third Office Action and Search issued in connection with corresponding CN Application No. 201580048820.0 dated Jul. 24, 2018 (7 pages).

International Searching Authority, "International Search Report and Written Opinion", issued in connection with International Application No. PCT/US2015/044709, dated Oct. 28, 2015 (11 pages).

Machine Translation and First Office Action and Search issued in connection with corresponding CN Application No. 201580048820.0 dated Sep. 29, 2017 (13 pages).

International Searching Authority, "International Preliminary Report on Patentability", issued in connection with International Application No. PCT/US2015/044709, dated Mar. 14, 2017 (6 pages).

United States Patent and Trademark Office, "Final Office Action", issued in connection with U.S. Appl. No. 15/510,841, dated Oct. 17, 2019, (11 pages).

United States Patent and Trademark Office, "Non-Final Office Action", issued in connection with U.S. Appl. No. 15/510,841, dated Mar. 7, 2019, (10 pages).

United States Patent and Trademark Office, "Notice of Allowance", issued in connection with U.S. Appl. No. 15/510,841, dated Feb. 6, 2020, (8 pages).

United States Patent and Trademark Office, "Notice of Allowance", issued in connection with U.S. Appl. No. 15/510,841, dated Feb. 20, 2020, (8 pages).

* cited by examiner

AXI-CENTRIFUGAL COMPRESSOR WITH VARIABLE OUTLET GUIDE VANES

RELATED APPLICATION

This patent arises from a continuation of U.S. patent application Ser. No. 15/510,841, (Now U.S. Pat. No. 10,704, 563) which was filed on Mar. 13, 2017, which arises from a national stage application of PCT Application Number PCT/US2015/044709, which was filed on Aug. 11, 2015, which claims the benefit of U.S. Provisional Patent Application No. 62/049,586, which was filed on Sep. 12, 2014. U.S. patent application Ser. No. 15/510,841, PCT Application Number PCT/US2015/044709, and U.S. Provisional Patent Application No. 62/049,586 are hereby incorporated herein by reference in their entireties. Priority to U.S. patent application Ser. No. 15/510,841, PCT Application Number PCT/US2015/044709, and U.S. Provisional Patent Application No. 62/049,586 is hereby claimed.

STATEMENT REGARDING FEDERALLY SPONSORED RESEARCH AND DEVELOPMENT

The U.S. Government may have certain rights in this invention pursuant to contract no W911W6-11-2-0009 awarded by the Department of Defense.

BACKGROUND OF THE INVENTION

This invention relates generally to turbomachinery compressors and more particularly relates to variable stator elements of such compressors.

A gas turbine engine includes, in serial flow communication, a compressor, a combustor, and turbine collectively constituting a turbomachinery core. The core is operable in a known manner, in conjunction with other engine components, to perform useful work such as providing propulsive thrust or mechanical work. One known configuration of the compressor is the "axi-centrifugal" compressor which includes an upstream axial-flow portion that discharges through a duct to a downstream centrifugal-flow portion.

Because of cycle demands for high pressure ratio and high efficiency, the diffuser throat flow area at the downstream end of the axi-centrifugal compressor is often relatively small. The result is that at part-speed conditions the maximum flow of the centrifugal portion of the compressor is less than the minimum stable flow of the axial compressor (i.e. the axial is pushed beyond its stall line). In prior art designs, compressor stability is achieved by extracting or "bleeding" excess flow from a location between the axial and the centrifugal compressor portions, or by using inlet guide vanes with a variable effective angle in the axial portion in order to throttle mass flow. Both of these methods can have negative impacts on performance and have limits to their effectiveness.

Accordingly, there remains a need for an axi-centrifugal compressor that is operable with good efficiency at varying flow rates.

BRIEF DESCRIPTION OF THE INVENTION

This need is addressed by a compressor having an upstream axial portion and a downstream centrifugal portion. Variable guide vanes are disposed between the axial and centrifugal portions.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
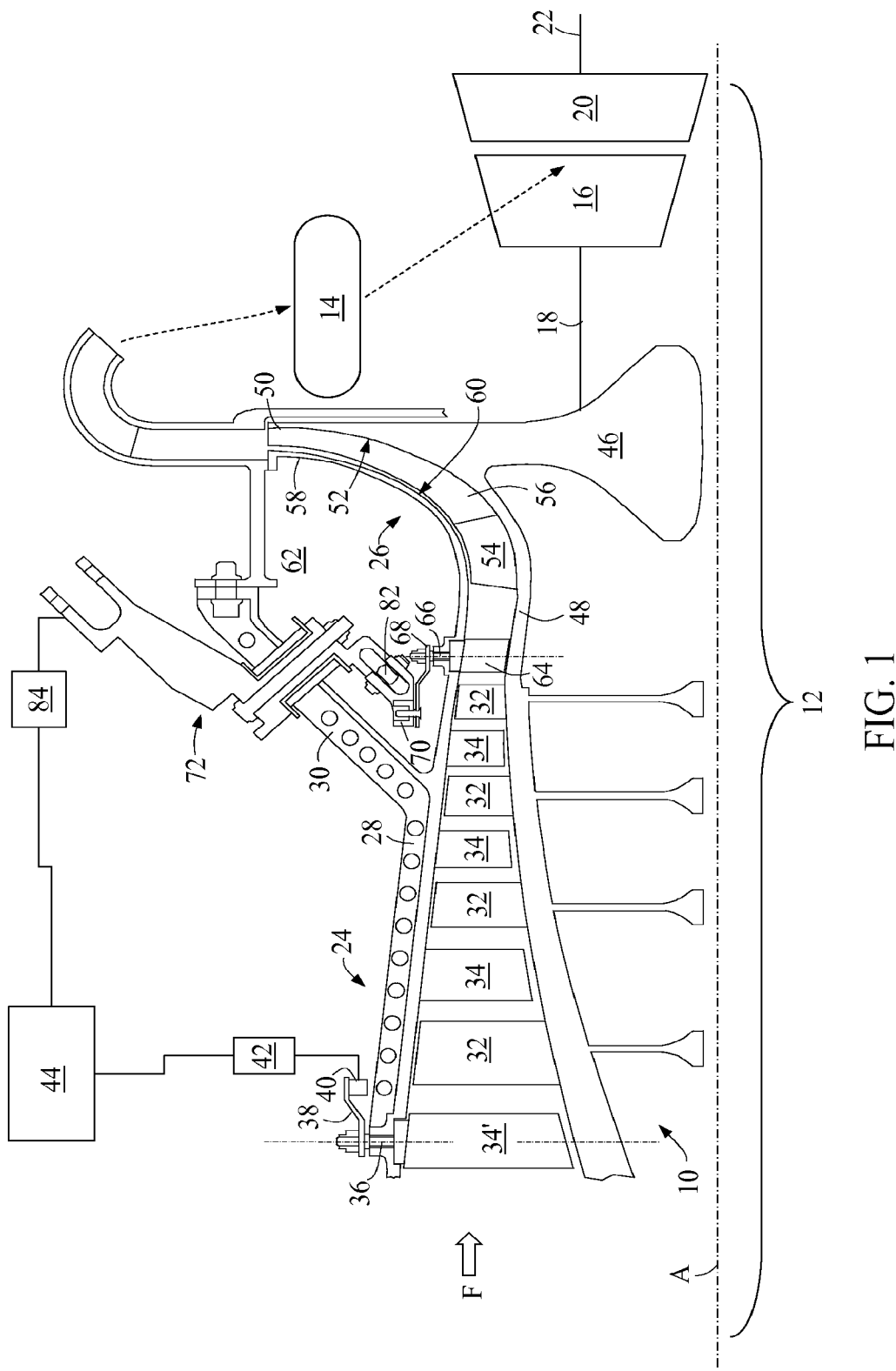
FIG. 1 is a half-sectional, schematic view of a gas turbine engine that incorporates a compressor apparatus.

Referring to the drawings wherein identical reference numerals denote the same elements throughout the various views, FIG. 1 depicts an exemplary compressor 10. In the illustrated example, the compressor 10 is incorporated into a gas turbine engine 12 with a central longitudinal axis "A" and including in sequential flow sequence, the compressor 10, a combustor 14, and a gas generator turbine 16 (the combustor 14 and compressor 10 are shown schematically). As used herein, the terms "axial" and "longitudinal" both refer to a direction parallel to the axis A, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The compressor 10 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any axi-centrifugal compressor. For example, they may apply to a compressor driven by an external prime mover.

The compressor 10 includes an upstream portion 24 and a downstream portion 26. An annular casing 28 surrounds the entire compressor 10. As viewed in cross-section, an aft portion of the casing 28 includes an outer skirt 30 that diverges radially outward from the main body of the casing 28, forming a "Y" shape. The upstream portion 24 of the compressor 10 is configured for axial fluid flow and may also be referred to as an axial-flow portion or simply an axial portion. It includes a number of stages, each of which includes a row of rotating airfoils or blades 32 and a row of stationary airfoils or vanes 34. The vanes 34 serve to turn the airflow exiting an upstream row of blades 32 before it enters the downstream row of blades 32.

Optionally, one or more rows of the vanes (one row, denoted 34' shown in FIG. 1) may be variable stator vanes or simply "VSVs"; the vanes 34' of these stages are constructed so that their angle of incidence (also referred to as "stagger angle") can be changed in operation (i.e. these stator vanes 34' can be pivoted about the axes shown in dashed lines). The VSVs enable throttling of flow through the upstream portion 24 in a known manner, so that it can operate efficiently at both high and low mass flow rates, without the losses incurred by other mechanisms such as bleed valves. The vane 34' of each VSV stage has a corresponding trunnion 36 that extends radially outward through the casing 28. An actuator arm 38 is attached to the distal end of each trunnion 36. All of the actuator arms 38 for an individual stage are coupled together by a unison ring 40. Rotation of the unison ring 40 about the engine's longitudinal axis A thus causes all of the actuator arms 38 coupled to that ring 40 to move in unison, in turn pivoting all of the trunnions 36 with their attached stator vanes 34' in unison. Any known type of actuator that is effective to turn the unison rings 40 may be used to operate the VSVs 34'. For example, hydraulic or electrical linear actuators may be used for this purpose. In the illustrated example, actuator 42 is shown schematically, coupled to the unison ring 40. The actuator 42 is operably connected to a controller 44, shown schematically in FIG. 1. This is a device capable of sending control signals to the actuators 42 and/or controlling the flow of an energy source such as pressurized fluid or electrical power. The controller 44 may be part of known engine control device such as a hydromechanical unit, a power management unit ("PMU"), or a full authority digital electronic control ("FADEC").

The downstream portion 26 of the compressor 10 is configured for centrifugal or mixed axial-centrifugal fluid flow and may be referred to as a centrifugal-flow portion or simply a centrifugal portion.

The downstream portion 26 includes an impeller 46 mounted for rotation with the shaft 18, and having axially forward and aft ends 48 and 50. The impeller 46 defines a generally concave-curved inner flowpath surface 52. The inner flowpath surface 52 extends in a generally longitudinal direction towards the forward end 48 and extends in a generally radial direction near the aft end 50. An annular array of airfoil-shaped impeller blades 54 extend radially outward from the inner flowpath surface 52. The impeller blades 54 are configured in terms of their dimensions, cross-sectional shape, orientation, spacing, and other parameters (in accordance with conventional practice) to provide an incremental pressure increase to the air flowing past them as the impeller 46 rotates. An annular array of splitter blades 56 alternate with the impeller blades 54 around the circumference of the impeller 46. The splitter blades 56 are similar in form to the impeller blades 54 but are shorter in axial length.

An annular shroud assembly 58 surrounds the impeller 46. The shroud assembly 58 defines a generally convex-curved outer flowpath surface 60 that closely surrounds the tips of the impeller and splitter blades 54 and 56. Together the inner and outer flowpath surfaces 52 and 60 define a primary flowpath through the downstream portion 26. A forward end of the shroud assembly 58 adjoins the casing 28, and the casing 28, its outer skirt 30, and the shroud assembly 58 collectively define the boundaries of an annular plenum 62.

A row of airfoil-shaped outlet guide vanes ("OGVs") 64 are disposed between the upstream portion 24 and the downstream portion 26. The OGVs 64 are constructed so that their stagger angle can be changed in operation (i.e. the OGVs 64 can be pivoted about the axis shown by a dashed line). The variable OGVs 64 enable changing the swirl (i.e. tangential velocity) of flow from the upstream portion 24 entering the downstream portion 26, as explained in more detail below. Each OGV 64 has a corresponding trunnion 66 that extends radially outward through the casing 28, into the plenum 62. An actuator arm 68 is attached to the distal end of each trunnion 66. All of the actuator arms 68 for the OGVs 64 are coupled together by a unison ring 70 disposed inside the plenum 62.

Figure 2:
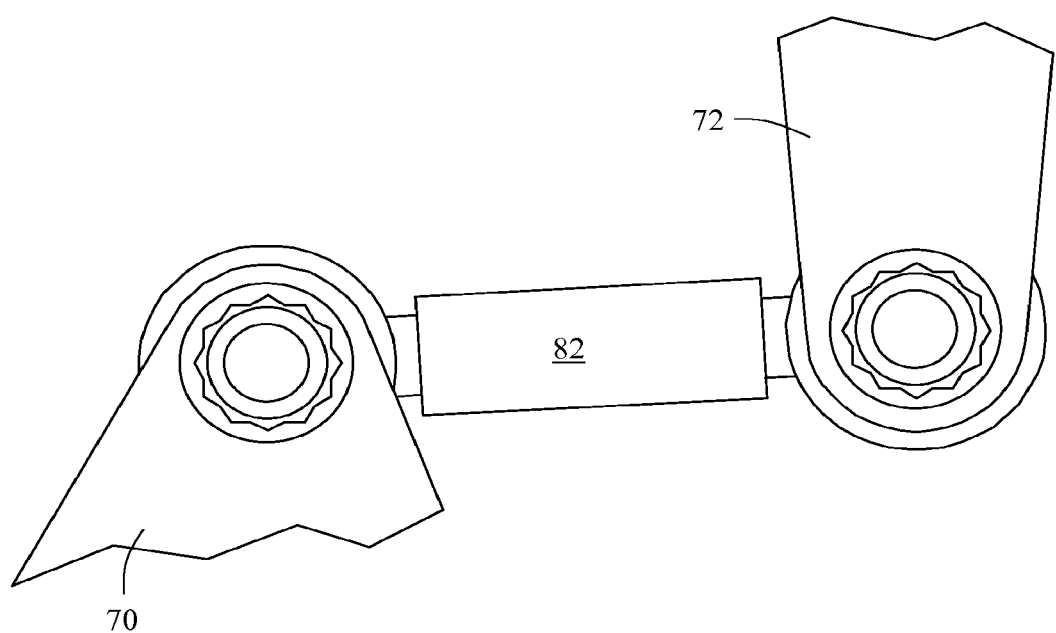
FIG. 2 is an aft elevational view of a portion of the compressor apparatus of FIG. 1.
Figure 3:
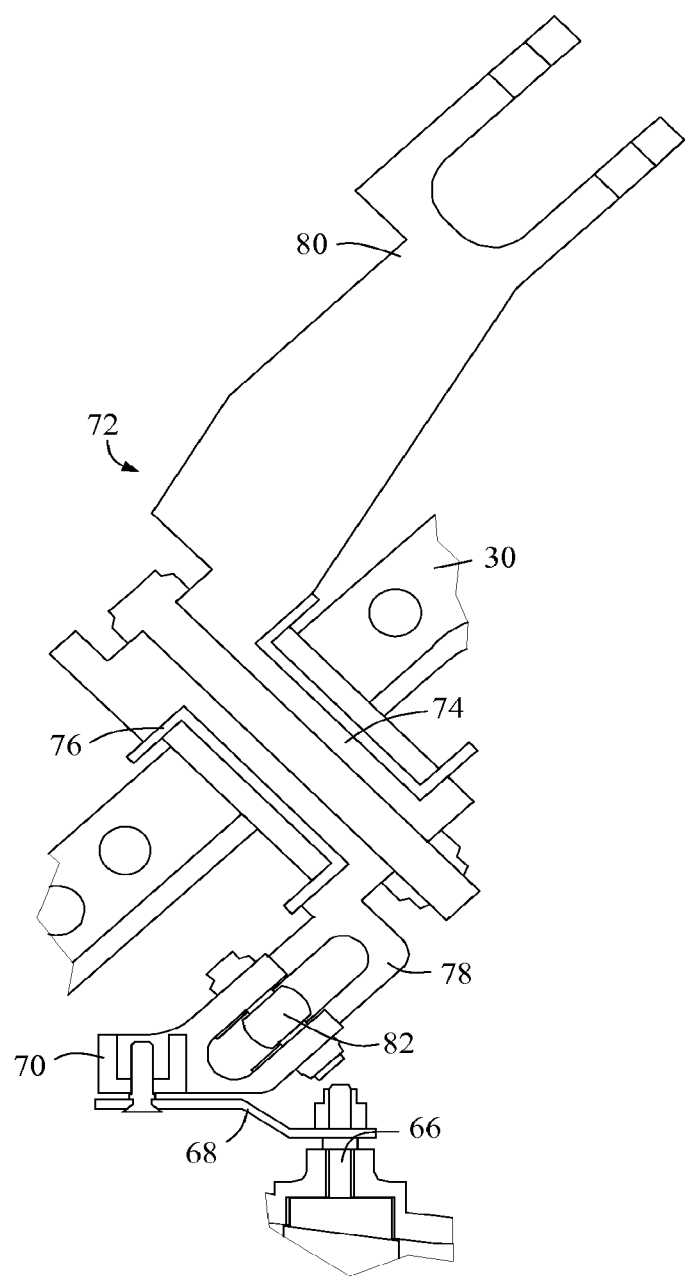
FIG. 3 is an enlarged half-sectional view of a portion of the compressor apparatus of FIG. 1.

A bellcrank 72, best seen in FIGS. 2 and 3, is mounted in the outer skirt 30 at approximately the same axial position as the OGVs 64. The bellcrank 72 includes a barrel 74 mounted for rotation in a bushing 76 in the outer skirt 30, an inner arm 78 disposed in the plenum 62, and an outer arm 80 disposed outside the outer skirt 30. The inner and outer arms 78 and 80 rotate as a unit with the barrel 74. A distal end of the inner arm 78 is connected to the unison ring 70 by a link 82 which extends in a generally tangential direction.

An actuator 84 (see FIG. 1) is disposed outside the outer skirt 30 and is coupled to a distal end of the outer arm 80. Any known type of actuator that is effective to turn the bellcrank 72 may be used to operate the OGVs 64. For example, hydraulic or electrical linear actuators may be used for this purpose. The actuators 84 is operably connected to the controller 44 shown schematically in FIG. 1. Thus coupled, linear movement of the actuator 84 causes pivoting of the bellcrank 72, in turn causing rotation of the unison ring 70. Rotation of the unison ring 70 about the engine's longitudinal axis A thus causes all of the actuator arms 68 coupled to the unison ring 70 to move in unison, in turn pivoting all of the trunnions 66 with their attached OGVs 64 simultaneously. Together, the link 82 and bellcrank 72 constitute a mechanical linkage operable to interconnect the actuator 84 and the unison ring 70. This permits the OGVs 64 to be operated without having to locate an actuator in the high-temperature, relatively crowded confines of the plenum 62. Other functionally-equivalent mechanical linkages and/or actuator configurations could be substituted for this purpose.

Figure 6:
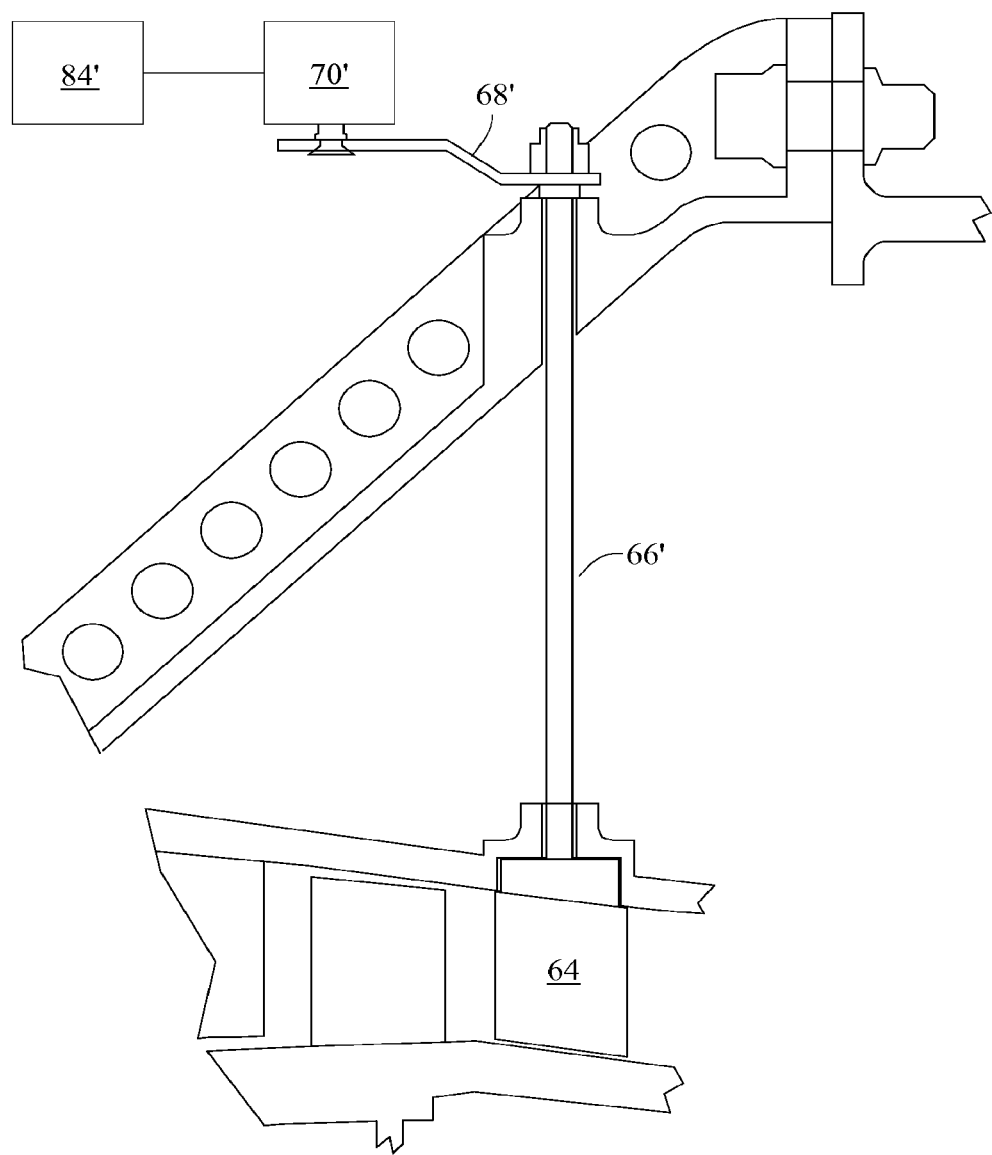
FIG. 6 is a half-sectional view of a portion of an alternative compressor apparatus.

For example, FIG. 6 illustrates an alternative arrangement in which the OGVs 64 are coupled to extended trunnions 66' that span across the plenum 62 and pass through an alternative version of the outer skirt 30'. An actuator arm 68' is attached to the distal end of each trunnion 66' and may be coupled to a unison ring 70' and actuator 84' disposed outside the outer skirt 30' (similar to the arrangement of unison ring 40 and actuator 42 shown in FIG. 1).

Figure 4:
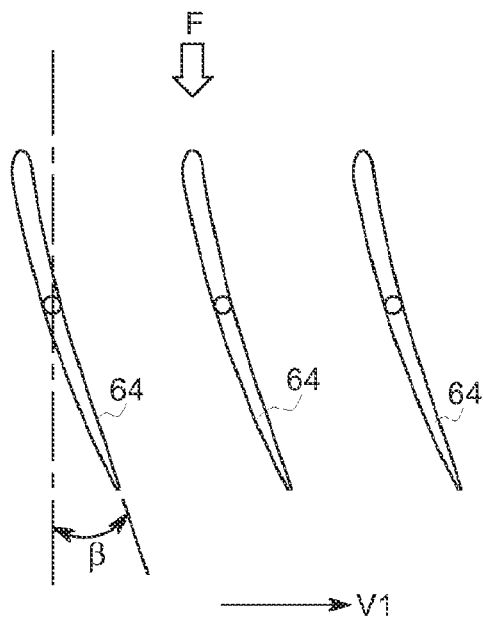
FIG. 4 is a schematic plan view of a set of outlet guide vanes in a first position.
Figure 5:
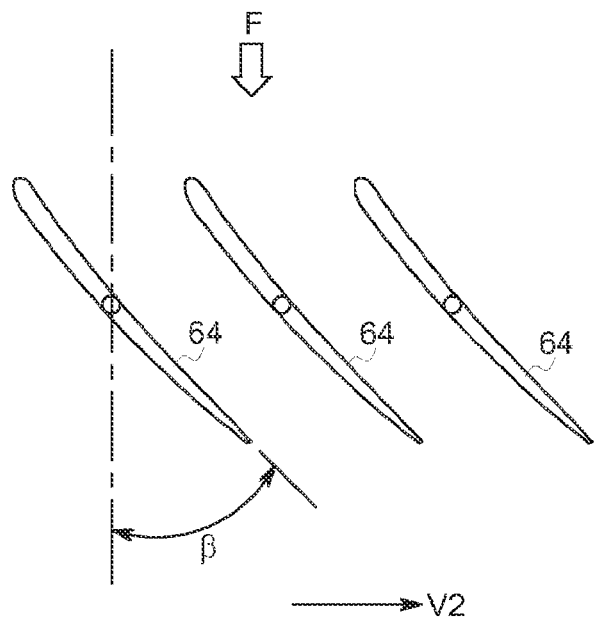
FIG. 5 is a schematic plan view of a set of outlet guide vanes in a second position.

In operation, the controller 44 is used to determine the proper stagger angle of the OGVs 64 and optionally the VSVs 34' for each engine operating condition. This may be implemented, for example, by way of an internally-stored electronic map or table listing the desired stagger angles for each operating condition. The engine's operating condition or state may be defined by one or more parameters such as operator control inputs, engine speed, or the fluid temperatures or pressures at various locations within the engine 12, all of which may be determined using known types of sensor devices. Based on the determination, the OGVs 64 and optionally VSVs 34 are then driven to the desired stagger angles using the actuators 42 and 84. FIG. 4 illustrates the OGVs 64 at a first relatively open stagger angle β which would result in a first, relatively lower tangential velocity "V1" or swirl of the flow passing therethrough. FIG. 5 illustrates the OGVs 64 at a second relatively closed stagger angle β which would result in a second, relatively higher tangential velocity "V2" or swirl of the flow passing therethrough.

The compressor 10 is capable of operating both at lower rotor speeds with lower mass flow and pressure ratio and at higher rotor speeds with higher mass flow and pressure ratio. As a general principle, the mass flow of the upstream and downstream portions 24 and 26 is inherently well-matched at higher power conditions (e.g. cruise power). However at partial power conditions the maximum flow through the downstream portion 26 of the compressor 10 is lower than required for stable operation of the upstream portion 24. According to the principles described herein, under such partial power conditions the OGVs 64 would be "opened", that is moving the OGVs relatively from the position shown in FIG. 5 to the position shown in FIG. 4. This lowers the swirl in the flow entering the downstream portion 26. This has the effect of increasing the pressure ratio and flow rate of the downstream portion 26. The flow rates are better matched and the axial operating line is lowered.

Optionally, in addition to manipulating the OGVs 64, the VSVs 34 may be closed at partial power levels, to reduce the flow and pressure ratio of the upstream portion 24 and better match the flow in the downstream portion 26. Optionally, air may be bled away from the upstream portion 24 in addition to manipulating the OGVs 64.

The apparatus described herein has several advantages over the prior art. The ability to lower the swirl entering the downstream centrifugal compressor will increase the pressure ratio and flow rate of the centrifugal compressor and lower the axial compressor operating line. This translates into lower bleed extraction at constant operability or improved operability margin with current levels of bleed. Reduction of bleed level has the intrinsic benefit of permitting smaller structures and lower weight. Additionally the variable OGV can be used to optimize efficiency along the operating line by changing the relative loading between the axial and the centrifugal portions of the compressor.

The foregoing has described a compressor with variable outlet guide vanes. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A compressor comprising:
a casing having a main portion and an outer skirt collectively defining an annular plenum;
an outlet guide vane coupled to the main portion;
an actuator mounted outside the outer skirt; and
a set of mechanical linkages coupled to the actuator and the outlet guide vane through the annular plenum, wherein the set of mechanical linkages crosses into the annular plenum, enabling direct actuation of the outlet guide vane.

2. The compressor of claim 1, wherein the linkages include a bellcrank mounted to the outer skirt, the bellcrank including a first arm coupled to a unison ring inside the annular plenum and a second arm coupled to the actuator outside the outer skirt.

3. The compressor of claim 2, wherein the bellcrank includes:
a barrel coupled to the first arm and the second arm; and
a bushing coupled to the barrel, the outer skirt, and the first arm.

4. The compressor of claim 2, wherein the linkages include a link that extends in a tangential direction, and wherein a distal end of the first arm is coupled to the unison ring by the link.

5. The compressor of claim 4, wherein the link and the bellcrank are operable to interconnect the actuator and the unison ring.

6. The compressor of claim 2, wherein a distal end of the second arm is coupled to the actuator.

7. The compressor of claim 1, further including:
a trunnion coupled to the outlet guide vane;
an actuator arm coupled to the trunnion;
a unison ring coupled to the actuator arm; and
a bellcrank coupled to the unison ring, the bellcrank including a first arm coupled to the unison ring inside the outer skirt and a second arm coupled to the actuator outside the outer skirt.

8. The compressor of claim 1, wherein the actuator is a hydraulic linear actuator or an electrical linear actuator.

9. The compressor of claim 1, wherein the outer skirt diverges radially outward from the main portion.

10. The compressor of claim 1, further including:
an upstream portion configured for axial fluid flow; and
a downstream portion configured for centrifugal or mixed axial-centrifugal fluid flow, the downstream portion including the outer skirt and an impeller, the impeller including an annular array of airfoil-shaped impeller blades extending outward from an inner flowpath surface of the impeller.

11. The compressor of claim 1, further including:
a plurality of blades coupled to a main portion of a casing upstream of the outer skirt; and
a plurality of vanes coupled to the main portion.

12. The compressor of claim 11, wherein the outlet guide vane is an airfoil-shaped outlet guide vane, and wherein one or more of the plurality of the vanes are variable stator vanes.

13. The compressor of claim 11, further including:
a plurality of trunnions coupled to respective ones of the plurality of the vanes, the plurality of the trunnions extending radially outward through the casing;
a plurality of actuator arms coupled to a distal end of respective ones of the plurality of the trunnions;

a unison ring coupled to respective ones of the plurality of the actuator arms; and an actuator coupled to the unison ring.

14. A compressor comprising:

an outer skirt of a casing of the compressor;

an outlet guide vane;

an extended trunnion coupled to the outlet guide vane, the extended trunnion extending at least partially through the outer skirt;

an actuator arm coupled to a distal end of the extended trunnion; and an actuator coupled to the actuator arm via a set of mechanical linkages, at least one of the actuator, the set of mechanical linkages, or the actuator arm disposed outside of the outer skirt, wherein the set of mechanical linkages crosses through the outer skirt of the casing, enabling direct actuation of an outlet guide vane.

15. The compressor of claim 14, further including an upstream portion configured for axial fluid flow and a downstream portion configured for centrifugal or mixed axial-centrifugal fluid flow, the downstream portion including the outer skirt and an impeller, the impeller including an annular array of airfoil-shaped impeller blades extending outward from an inner flowpath surface of the impeller.

16. The compressor of claim 14, wherein the casing includes a main portion and the outer skirt, the main portion upstream of the outer skirt, the outer skirt to diverge radially outward from the main portion.

17. A gas turbine engine comprising:

a compressor including:
  a casing having a main portion and an outer skirt collectively defining an annular plenum;
  an outlet guide vane coupled to the main portion;
  an actuator mounted outside the outer skirt; and
  a linkage coupled to the actuator and the outlet guide vane through the annular plenum, the linkage to enable direct actuation of the outlet guide vane;

a combustor disposed downstream of the compressor;

a turbine disposed downstream of the combustor; and a shaft interconnecting the turbine and the compressor.

18. The gas turbine engine of claim 17, wherein the turbine is a first turbine and further including a second turbine disposed downstream of the first turbine.

19. The gas turbine engine of claim 17, wherein the linkage includes a bellcrank mounted to the outer skirt, the bellcrank including a first arm coupled to a unison ring inside the annular plenum and a second arm coupled to the actuator outside the outer skirt.

20. The gas turbine engine of claim 17, further including:

a trunnion coupled to the outlet guide vane;

an actuator arm coupled to the trunnion;

a unison ring coupled to the actuator arm; and a bellcrank coupled to the unison ring, the bellcrank including a first arm coupled to the unison ring inside the outer skirt and a second arm coupled to the actuator outside the outer skirt.

* * * * *